US005806017A

United States Patent [19]
Hancock

[11] Patent Number: 5,806,017
[45] Date of Patent: Sep. 8, 1998

[54] ELECTRONIC AUTOROUTING NAVIGATION SYSTEM FOR VISUALLY IMPAIRED PERSONS

[75] Inventor: Michael B. Hancock, Galveston, Tex.

[73] Assignee: Board of Regents The University of Texas System, Austin, Tex.

[21] Appl. No.: 699,580

[22] Filed: Aug. 19, 1996

[51] Int. Cl.$^6$ .......................... G01C 21/00; G06F 165/00
[52] U.S. Cl. ............................ 701/209; 701/211
[58] Field of Search .................. 364/443, 444.1, 364/444.2, 448, 449.2, 449.3, 449.5; 701/200, 201, 202, 206, 208, 209, 211

[56] References Cited

U.S. PATENT DOCUMENTS

| | | | |
|---|---|---|---|
| 3,104,478 | 9/1963 | Strauss et al. | 35/25 |
| 3,718,896 | 2/1973 | Mowat | 340/1 R |
| 4,025,922 | 5/1977 | Trawick, III | 343/6.5 LC |
| 4,045,799 | 8/1977 | Dapiran | 343/113 PT |
| 4,119,811 | 10/1978 | Moricca et al. | 340/407 |
| 4,193,689 | 3/1980 | Reymond et al. | 356/152 |
| 4,648,710 | 3/1987 | Ban et al. | 356/4 |
| 4,660,022 | 4/1987 | Osaka | 340/407 |
| 4,904,993 | 2/1990 | Sato | 340/825.57 |
| 4,935,907 | 6/1990 | Friedman | 367/118 |
| 5,032,083 | 7/1991 | Friedman | 434/112 |
| 5,032,836 | 7/1991 | Ono et al. | 340/325.71 |
| 5,067,081 | 11/1991 | Person | 364/444 |
| 5,144,294 | 9/1992 | Alonzi et al. | 340/825.49 |
| 5,214,410 | 5/1993 | Verster | 340/572 |
| 5,406,491 | 4/1995 | Lima | 364/449 |
| 5,487,669 | 1/1996 | Kelk | 434/112 |
| 5,508,699 | 4/1996 | Silverman | 340/944 |
| 5,600,706 | 2/1997 | Dunn et al. | 379/59 |

FOREIGN PATENT DOCUMENTS

| | | |
|---|---|---|
| 0 338 997 | 10/1989 | European Pat. Off. . |
| 2 661 607 | 11/1991 | France . |
| WO 95/04440 | 2/1995 | WIPO . |

OTHER PUBLICATIONS

Yewman, "The Seeing–Eye Box," *Biomedical Inquiry*, The University of Texas Medical Branch at Galveston, Spring 1996.

*Primary Examiner*—Michael Zanelli
*Assistant Examiner*—Edward Pipala
*Attorney, Agent, or Firm*—Arnold, White & Durkee

[57] ABSTRACT

The present invention is an autorouting navigation system for directing one or more visually impaired persons to a physical location. The present invention includes a portable autorouting navigation unit that includes an input device for selecting a target location corresponding to a physical location of a plurality of location beacons, a receiver configured to receive signals from the location beacons, a memory storing information correlating the locations of the location beacons, and an output device for communicating with the user. A microcontroller or microprocessor under program control processes the signals received from the location beacons, analyzes those signals and correlation data, and determines a routing path from the user's present position to the target location. The microcontroller may also provide an indication, such as an audible sound, to the user of whether or not the user is following the routing path to the target location. Significantly, the present invention relies upon beacons that send out location and direction information without being polled by the portable unit determines a routing path that allows for autorouting. Beacons may also be organized in groups of beacons that can correlate to geographical landmarks such as hallways in a building to reduce the size of the correlating data stored in the memory of the portable unit and thereby reduce processing time.

15 Claims, 10 Drawing Sheets

ELECTRONIC AUTOROUTING NAVIGATION SYSTEM FOR VISUALLY IMPAIRED PERSONS

BACKGROUND OF THE INVENTION

The present invention relates to systems for guiding visually impaired individuals so that they may achieve greater independence in reaching desired destinations or targets, particularly in unfamiliar buildings.

Various methods and systems have been devised to aid visually impaired persons in guiding themselves through unfamiliar surroundings. From such early and crude devices as the long cane have evolved electronic systems that provide audible or tactile stimuli as guide indicators for the visually impaired. For example, traffic signals have been developed that produce sounds to inform visually impaired persons about traffic signal states.

More sophisticated systems have also evolved, such as that disclosed by Osaka, U.S. Pat. No. 4,660,022, in which the user carries a transmitter control unit that activates location indicators. By actuating the transmitter control unit, the user causes a control signal to be transmitted to a receiver that is placed near a desired location. Upon reception of the control signal, the receiver emits an audio signal that guides the user to the desired location. Although this system may effectively guide the user toward a desired destination, it has two significant drawbacks: (1) a loud audio signal is produced at the target, which may be distracting to others in the vicinity; and (2) the system employs polling which does not accommodate multiple users because the user does not know whether or not someone else is activating the audio signal, and because simultaneous polling transmissions mutually interfere.

Another system is shown in U.S. Pat. No. 4,935,907 to Friedman. This system is an electronic homing system for directing a user to a plurality of objects. The system includes a plurality of remote modules and a portable module. The remote modules transmit an uncoded omnidirectional ultrasonic signal in response to a coded request signal sent from the portable unit. The portable unit receives the ultrasonic signal binaurally, and converts differences in the time of arrival of the ultrasound reaching the detectors into an audible signal that guides the user to the desired remote module. Again, this system requires that the portable unit actively poll the remote modules, that the remote modules send back a signal in response to that polling, and that the portable unit receive a response signal. This requirement of polling creates significant problems with multiple users. Furthermore, in such a system, for a user to reach a remote module that is not presently near the user, there must generally be provided relay modules, or repeaters, which convey the signal from the activated remote module through several rooms or corridors to the user. Guidance or navigation systems that use polling may be acceptable for single users, but they are virtually useless in multiple user areas, such as in rehabilitation centers and schools for visually impaired persons, because simultaneous polling transmissions from multiple users result in mutual interference and cause erratic and non-specific beacon activation. This is likely the reason why prior systems have not achieved commercial success.

An object of the present invention is to overcome these problems with prior systems, and provide an electronic navigation system capable of simultaneously directing any number of visually impaired users to a plurality of locations, and in particular to locations within a building, between buildings on a campus, or within a small neighborhood.

SUMMARY OF THE INVENTION

The present invention contemplates an autorouting navigation system for directing one or more visually impaired persons to a physical location. In partial respects, the present invention includes a portable autorouting navigation unit having an input device (e.g., a keypad) for selecting a target location corresponding to a physical location of a plurality of location beacons, a receiver configured to receive signals from the location beacons, a memory that stores information correlating the locations of the location beacons, and an output device for communicating with the user.

In one significant respect, the present invention relies upon location beacons that send out location and direction information without being polled by a portable unit from any single user. More specifically, the present invention may utilize location beacons that transmit digitally-modulated infrared (IR) signals without being polled by a portable unit from any user. The system, therefore, is passive (i.e., it does not use polling). The IR signals transmitted by the location beacons include digital location and direction information about the physical location of a beacon and about the direction of travel of the user relative to the beacon. The signals may be received by any portable unit held by one of a plurality of users when that user is within range of the beacon.

In more detailed respects, the location beacons may be grouped according to geographical subdivisions, such as hallways in buildings. The microcontroller within a portable unit may be programmed to use several logic statements along with beacon correlation or lookup tables to determine a set of intermediate or way-point beacons by which the user is routed to the desired location beacon (i.e., the target beacon). In this manner, the present invention may be autorouting and provide a routing path to guide the user from beacon to beacon to the user's ultimate destination.

In another respect, the autorouting navigation system of the present invention includes a plurality of location beacons positioned at a plurality of physical locations and at least one portable navigation unit. The location beacons emit signals including information representative of physical locations of the location beacons. Each location beacon includes a transmitter for emitting the signal, and a control means for causing the transmitter to emit the signal. The portable navigation unit includes an input device for selecting a target location, a receiver configured to receive signals from the location beacons, a memory storing correlation data linking the location beacons together, an output device, and a control means. The control means may be a microcontroller under program control and is electronically coupled to the input device, the receiver, the memory and the output device. The control means processes the signals from the location beacons and analyzes the correlation data to determine a routing path to the target location. The control means also causes the output device to indicate to a user that the user is following the routing path to the target location.

In a further embodiment, the plurality of location beacons are organized into a plurality of groups of location beacons and the correlation data links the plurality of groups of location beacons. Also, the signal emitted by the location beacons within a group of location beacons may include information identifying the location beacon within the location beacon's respective group. Each beacon may also have a plurality of transmitters providing at least two transmission directions. In particular, the two transmission directions may be separated by over 90°. The beacons may also be organized into groups, and each group of location beacons may include a master beacon and a plurality of slave beacons, which are controlled by the master beacon. The beacons may also emit infrared (IR) signals, and the receiver of the portable navigation unit may be constructed to receive the infrared signals.

In another respect, the present invention is a method of automatically routing at least one visually impaired person to a target location. This method includes the steps of positioning a plurality of location beacons at physical locations, generating correlation data linking the location beacons, storing the correlation data within a portable navigation unit, inputting a target location into the portable navigation unit, determining with the portable navigation unit a routing path to the target location, scanning with the portable navigation unit to detect a signal from at least one of the plurality of location beacons, determining with the portable navigation unit whether the signal corresponds to the routing path, and providing an output signal indicating to a user whether the user is proceeding along the routing path to the target location. In further respects, the plurality of location beacons may be positioned at physical locations within the interior hallways of a building.

DETAILED DESCRIPTION

The present invention contemplates an electronic, microcontroller-based, autorouting navigation system capable of simultaneously directing one or more blind users to a plurality of locations. The present invention may include a plurality of beacons (e.g., microcontroller-equipped, infrared (IR) transmitters) that may be positioned at physical locations, which are potential destinations for a visually-impaired user. For example, beacons may be located over doorways or facilities, such as restrooms, water fountains, stairways, elevators, or the like. These beacons may be programmed to transmit information concerning the physical location of the beacon and the direction to the beacon. A portable unit, which may be held by the user, may be programmed to receive these transmissions, to determine a routing path from the user's current location to the target location, and to direct a user to the desired location. Thus, this invention provides autorouting, which has not been provided in systems previously designed to guide a blind user, and is passive so that any number of visually impaired persons may use the system simultaneously.

Each physical location may also be identified with multiple beacons, such as a main IR transmitter beacon and an auxiliary IR transmitter beacon. To identify a physical target location, a main beacon may be located high on the wall or ceiling above the target. An auxiliary beacon, which corresponds to this main beacon, may be mounted in close proximity to a relevant structure of the target location, for example at waist level on a wall next to a door knob.

The beacon transmissions may be sets of four code numbers sent via infrared emitting diodes (IRED's) driven by a microcontroller. In this embodiment, each of the code numbers is serially transmitted as an eight-bit (no parity, one stop bit) byte. This is adequate for most buildings, since few have more than 255 floors, hallways, or rooms per floor, which need identification. Beacons that are within line-of-sight of one another may also be slaved to a master microcontroller which sets the cycle period and sequentially activates the beacons. Master controllers for different groups of beacons may free-run, or they may be linked, so that two activated beacons are never visible simultaneously to an observer to prevent mutual interference between IR transmissions. Beacon transmissions may be detected and processed by hand-held, portable units, such as an infrared receiver/microcontroller (IRRM). Because each beacon transmits a distinct set of code numbers, each beacon may be "identified" by the IRRM.

In one embodiment, for example, the user turns on the IRRM, which resets the microcontroller, and enters, via the IRRM keypad, the floor number followed by the room number of the target beacon (e.g., "236"—second floor, room 36). This three-digit number is termed the room or facility ID number, and may be obtained by the user from a Braille directory or from a voice-storage device that is part of, or an accessory to, the IRRM. The user scans the environment horizontally until a beacon is detected. A search algorithm is executed by the IRRM microcontroller to determine a route or routing path from the beacon detected at the user's starting location to the target beacon. This routing path may depend upon a look-up table or other information, correlating the beacons to each other. Main beacons other than the target main beacon may serve as intermediate or way-points to the target location. The user receives a signal, such as an audible signal (e.g., single tone burst), each time the IRRM detects an IR transmission from a valid way-point beacon. The user will receive or hear a different audible signal (e.g., a triple tone burst) when the target auxiliary beacon has been detected. At any point along the route, the user may reset the IRRM microcontroller by turning it off and then on again. The user then reenters the same, or a different, target ID number. A new route or routing path will then be determined by the IRRM.

The autorouting program for a particular building or campus may be uploaded into an IRRM in a reception area near the building entrance. A receptionist, or the user, could upload the program from a fixed computer. Alternatively, the program could be loaded automatically through serial, wireless communication (i.e., infrared or radio frequency transmission) which would serve to connect the IRRM with a fixed computer.

Additional information may also be provided to a user. For example, a directory of facilities or individuals within a building or group of buildings along with their corresponding ID numbers may be stored in a Braille listing or in a digital voice-storage device contained within the IRRM or attached to the IRRM as an accessory. A subroutine in the IRRM program could allow the directory to be announced. For instance, the microcontroller may be programmed so that pressing the "#" key on the IRRM keypad, after the microcontroller is reset, may direct the voice-storage device to announce all of the listings in the directory. Also, pressing the "*" key after reset may direct the microcontroller to identify only the beacon first detected after the key is pressed. This would allow the user to get oriented quickly. The digital voice-storage device may be an integrated circuit (IC) chip installed either in the IRRM or in a detachable unit that may be kept separate from the IRRM.

Now an embodiment of the present invention will be described in more detail with reference to the attached drawings. As would be understood by one of skill in the art, alternative embodiments of the present invention, as well as alternative embodiments of the systems depicted in the drawings, are possible.

Figure 1A:
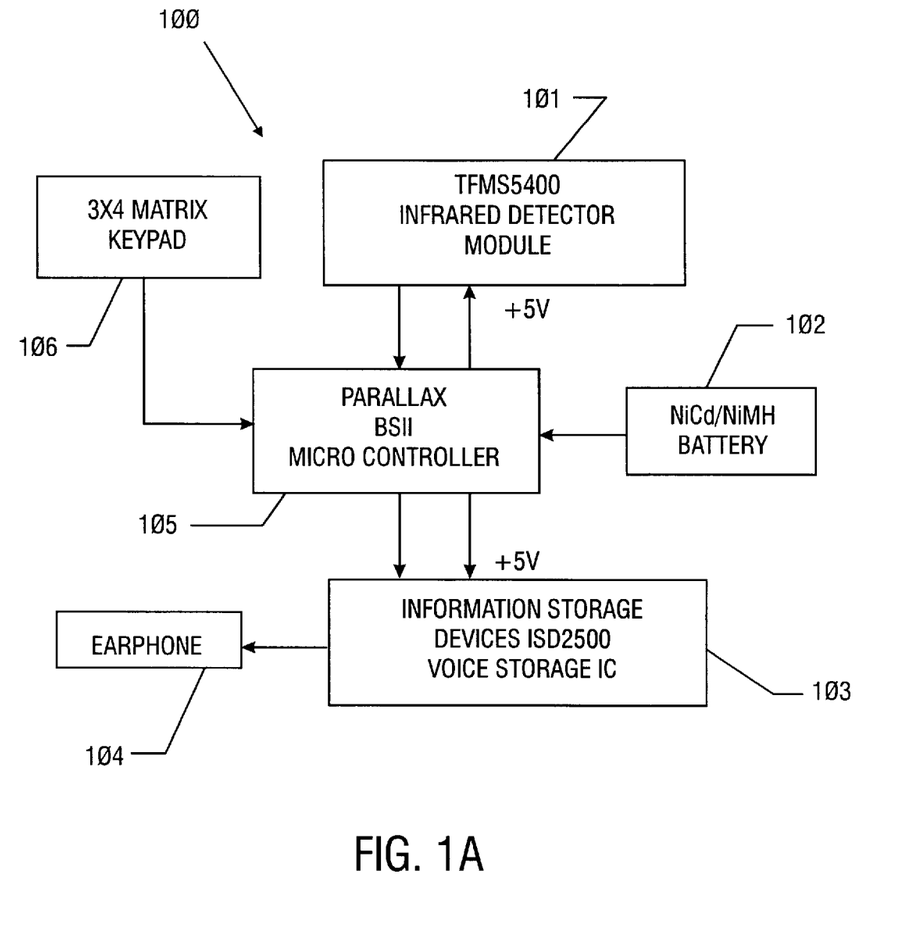
FIG. 1A is a block diagram of connections for the basic components of a portable navigation unit (e.g., an infrared receiver/microcontroller (IRRM)) according to the present invention.

The block diagram in FIG. 1A shows an embodiment of a portable autorouting navigation unit, according to the present invention, in the form of an infrared receiver/microcontroller (IRRM) 100. The IRRM 100 includes a microprocessor or microcontroller 105, for example a BASIC STAMP II microcontroller (BSII, available from Parallax, Inc., 3805 Atherton Rd., #102, Rocklin, Calif. 95765). This microcontroller 105 may have internal RAM memory that allows storage of information. Microcontroller 105 controls the activities of the portable device. The microcontroller is connected to an input device, such as a keypad 106, for entering data into the device. The keypad 106 may be a 3×4 matrix device with keys for digits 0–9 and for characters "*" and "#". The microcontroller 105 is also connected to a receiver 101, such as a TFMS5400 (Telefunken) infrared detector module, that receives information being sent from the location beacons. The microcontroller 105 may be connected to an output device 103, such as an ISD2500 voice-storage IC, which is available from Information Storage Devices and which is capable of storing 90 seconds of speech. An earphone 104, or other speaker or output device, may be connected to the voice-storage IC. This allows either a tone or audio instruction to be provided to the user. Finally, the IRRM 100 may contain a power supply 102, such as a nickel/cadmium (NiCd) or nickel/metal hydride (NiMH) rechargeable battery. A voltage regulator on the BSII microcontroller provides 5 volt power to the infrared detector module 101 and the voice-storage IC 103. ISD2500 voice-storage ICs may also be cascaded to provide additional speech storage. It is noted that the embodiment depicted and described herein is one example embodiment, and that alternative designs and embodiments may be used for a portable autorouting navigation unit for receiving transmitted location information, according to the present invention.

Figure 1B:
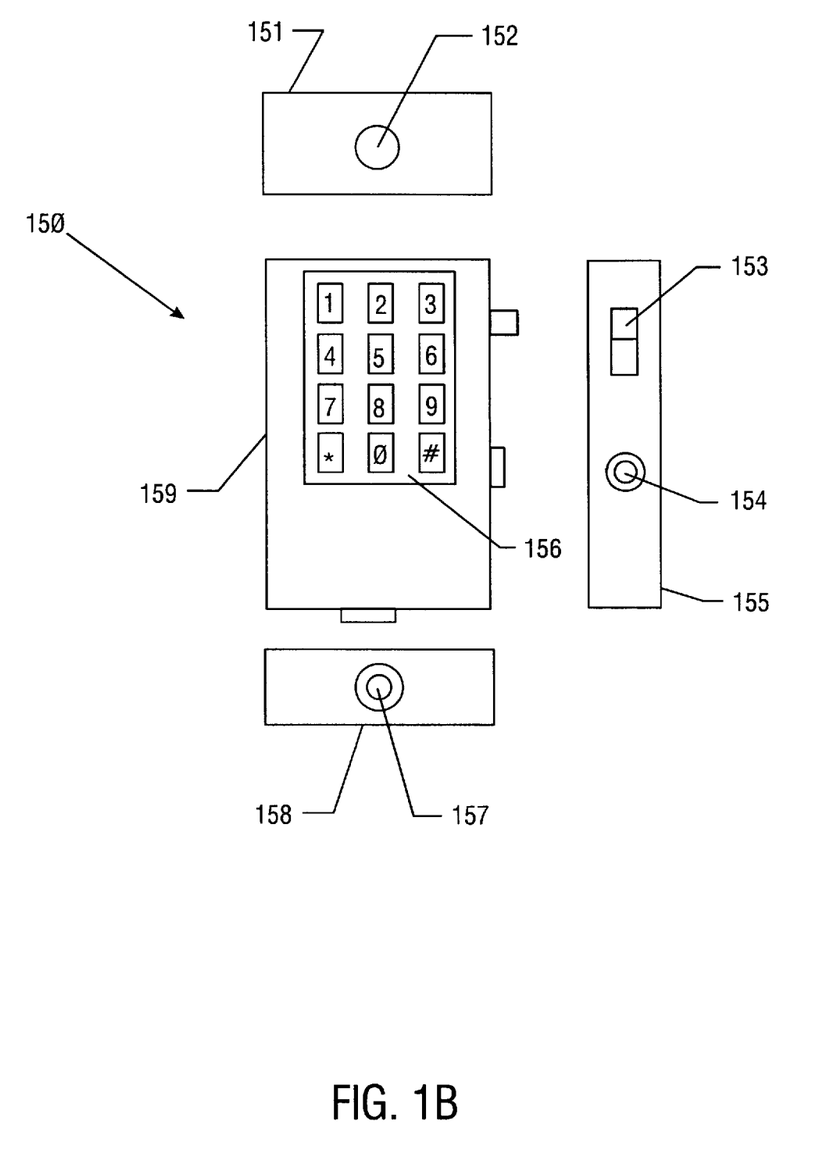
FIG. 1B is a diagram of external features for a portable navigation unit (e.g., IRRM) according to the present invention.

FIG. 1B shows the external features of an embodiment of an IRRM 150. The front surface 151 has a port 152 to allow the entry of an IR signal. A 3×4 matrix keypad 156 is mounted on the top 159 of the IRRM 150. The side 155 of the IRRM 150 contains an on–off slide switch 153 and a connector 154 to connect an external power supply for recharging the internal battery. The rear 158 of the IRRM 150 contains a connector 157 to attach an earphone.

Figure 2A:
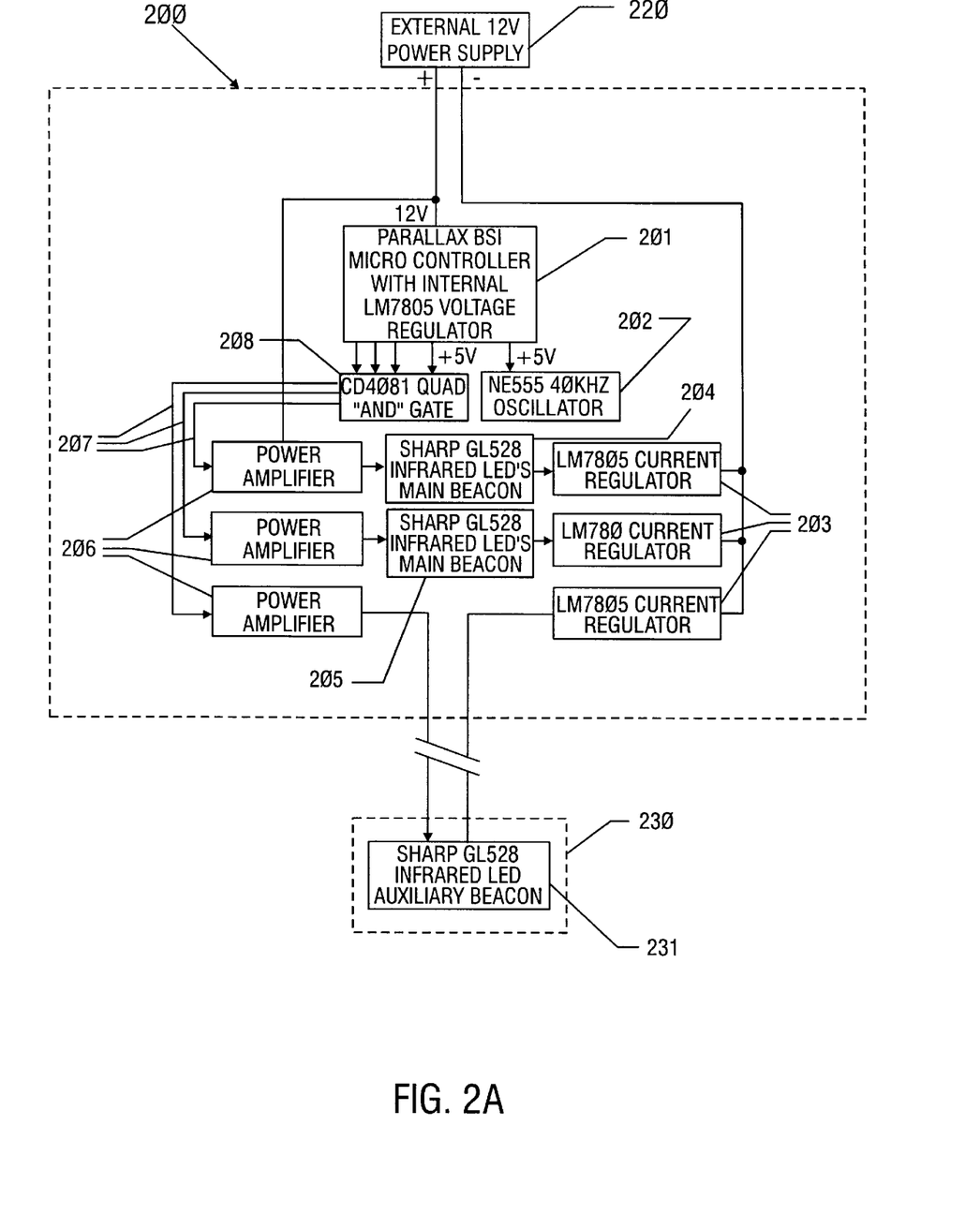
FIG. 2A is a block diagram of connections between components of a main location beacon and an auxiliary location beacon for identifying physical locations, according to the present invention.

FIG. 2A is a block diagram of an embodiment of the present invention showing the connections between the components of a main beacon 200 and an auxiliary beacon 230. A main beacon 200 may be mounted high on the wall or ceiling to identify a physical location. An auxiliary beacon 230 may be connected to the main beacon 200 and mounted in close proximity to a particularly relevant part of a target location, such as a door knob on a door.

For controlling the device, the main beacon 200 may include a microprocessor or microcontroller 201, such as a BASIC STAMP I microcontroller (BSI, available from Parallax, Inc., 3805 Atherton Rd., #102, Rocklin, Calif. 95765). An external power supply 220, such as a 12 volt DC power supply, may be connected to main beacon 200 to supply power both to the main beacon 200 and auxiliary beacon 230. The main beacon 200 may also include an oscillator 202, such as a NE555-based oscillator providing a 40 KHz subcarrier, which can be modulated by digital signals from the microcontroller 201. The 40 KHz signal and the serial outputs (8 data bits, no parity, and 1 stop bit) of the BSI microcontroller 201 provide inputs to logic gates 208, such as a CD4081 two-input, quad, AND gate integrated circuit. The output 207 of the AND gates switches power amplifiers 206. The 40 KHz chopping of the serial outputs is required in this embodiment because the IR detector module in the IRRM 100 contains a 40 KHz band-pass filter for noise reduction. The power amplifiers 206 switch the current in the infrared emitting diodes (IRED) 204 and 205 of the main beacon and infrared emitting diode 231 of the auxiliary beacon. The LED's may be a IRED by the designation GL528, which is made by Sharp. The current through the IRED's 204, 205 and 231 are set at 80–100 mA by current regulators, such as LM7805 current regulators. The IRED 231 of the auxiliary beacon 230 may also be driven at low power, so that IRED 231 may be detected by the portable navigation unit only when the user is within several feet of the beacon. As noted above, the embodiment depicted and described herein is one example embodiment, and alternative designs and embodiments may be used for a beacon that transmits location information, according to the present invention.

Figure 2B:
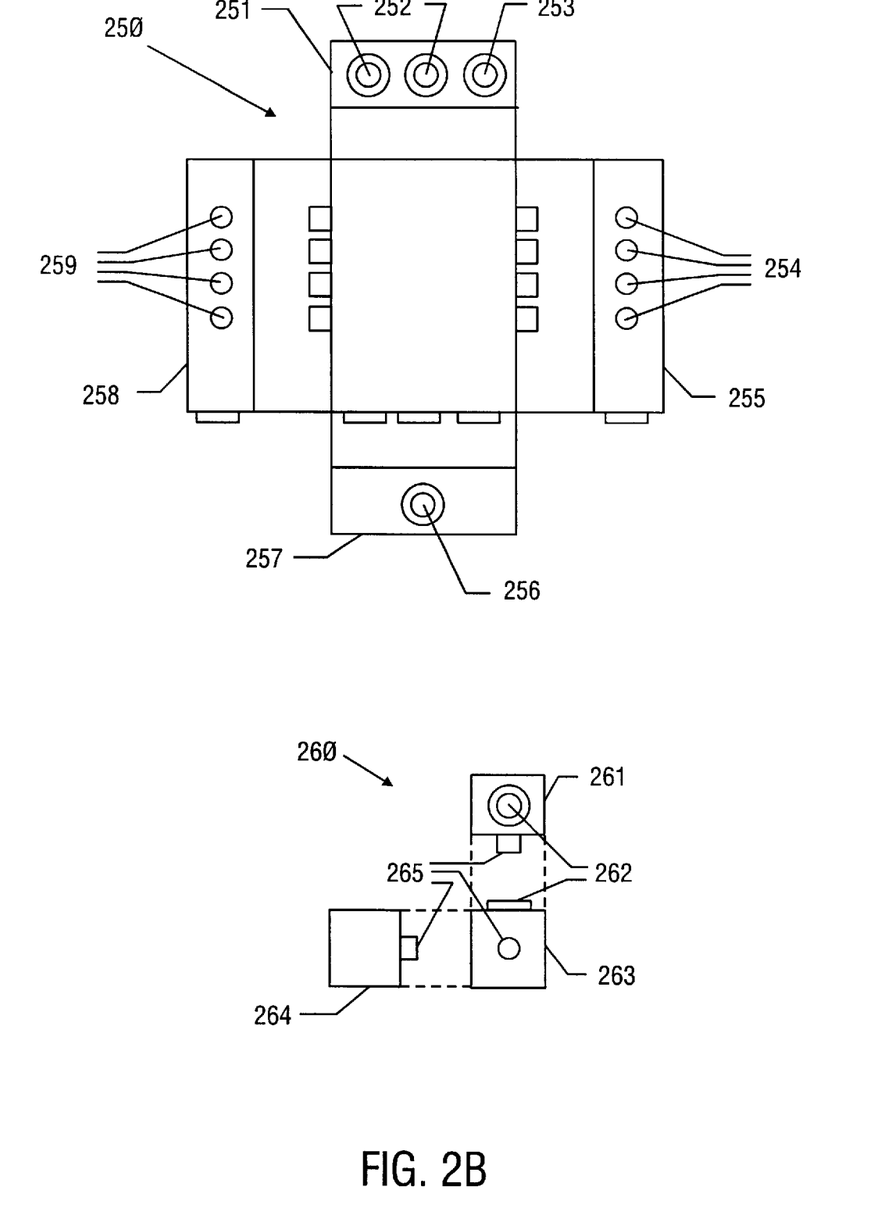
FIG. 2B is a diagram of external features for a main location beacon and an auxiliary location beacon according to the present invention.

FIG. 2B shows the external features of an embodiment of a main beacon 250 and an auxiliary beacon 260. Three connector ports 252 and 253 are mounted in the top of the main beacon. Connector ports 252 are used to link to other beacons. Such a link allows other beacons to serve as a master beacon or slave beacons to main beacon 250. This interconnection of beacons may also be used for sequential activation of adjacent beacons. In other words, a number of location beacons may be organized in a group of location beacons, for example in a hallway of a building. One of the location beacons within the group may serve as a master beacon and thereby control the transmissions of the other slave beacons. In this manner, location beacons within a group of beacons may be sequentially activated so that only one beacon within the group is sending out a signal at any one time. This may help avoid interference in system operation.

Power is supplied to the main beacon 250 through connector port 253. Multiple (e.g., four) IREDs 254 and 259 are located on sides 259 and 254 of the main beacon 250. The bottom 257 of the main beacon 250 includes an additional connector port 256 that is used to connect the main beacon 250 to connector port 262 in the top 261 of the auxiliary beacon 260. The front of auxiliary beacon 260 may include an IRED 265. The bottom 264 of auxiliary beacon 260 may be featureless.

Figure 3:
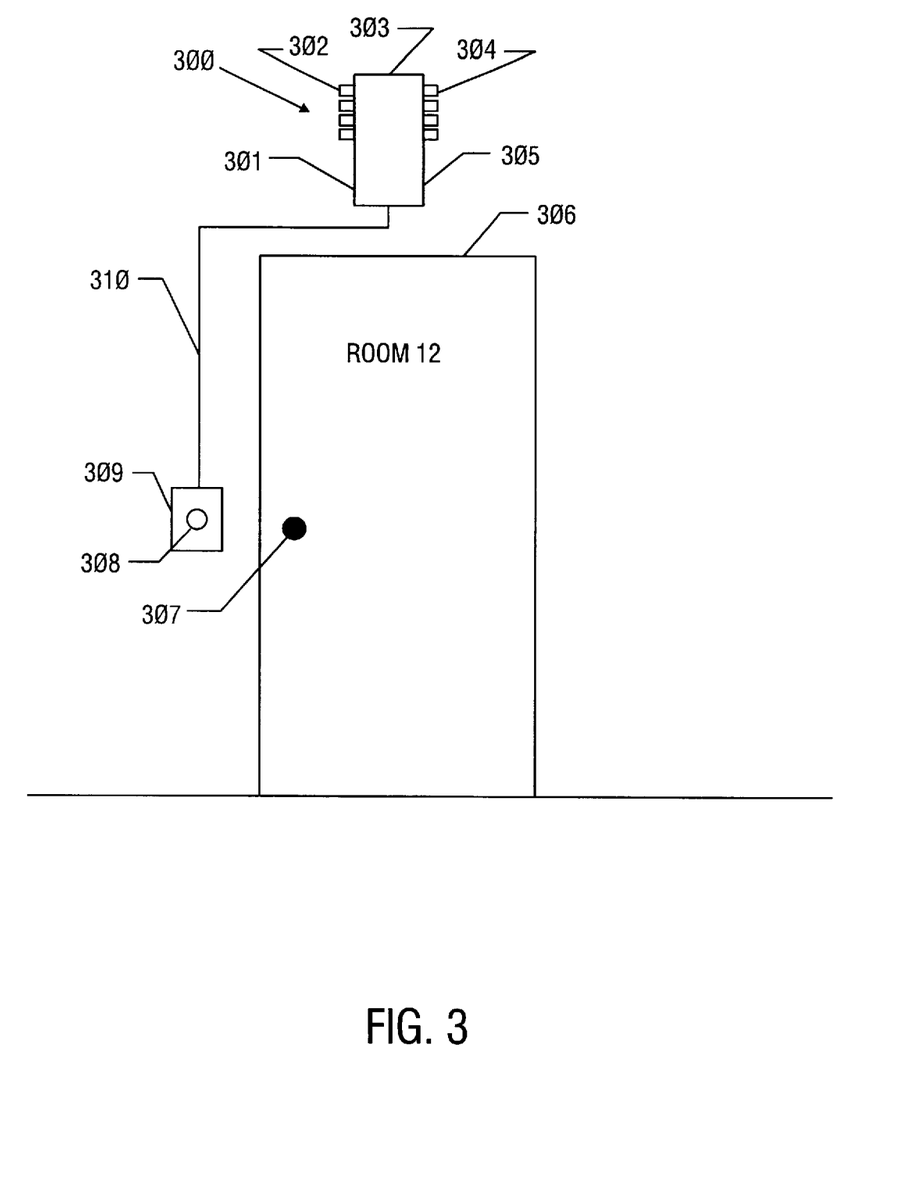
FIG. 3 is a diagram showing an example of how a main location beacon and an auxiliary location beacon may be located at a doorway, according to the present invention.

FIG. 3 is a diagram of an example positioning of a beacon 300 at a physical location. In particular, FIG. 3 shows an example placement of a main beacon 303 and an auxiliary beacon 309 with respect to a doorway 306 and a door knob 307 of an example "Room 12." The IREDs 302 (four IRED's shown) and 304 (four IRED's shown) of main beacon 303 are aimed in generally opposite directions down the hallway in which Room 12 is located. The auxiliary beacon 309 is mounted close to the door knob 307. The IRED 308 of the auxiliary beacon 309 is aimed across the hallway. Each group of IREDs 302, 308, and 304 are activated sequentially, and each group of IREDs transmits a different set of code numbers to provide location information regarding the main beacon 303 and the auxiliary beacon 309.

Figure 4:
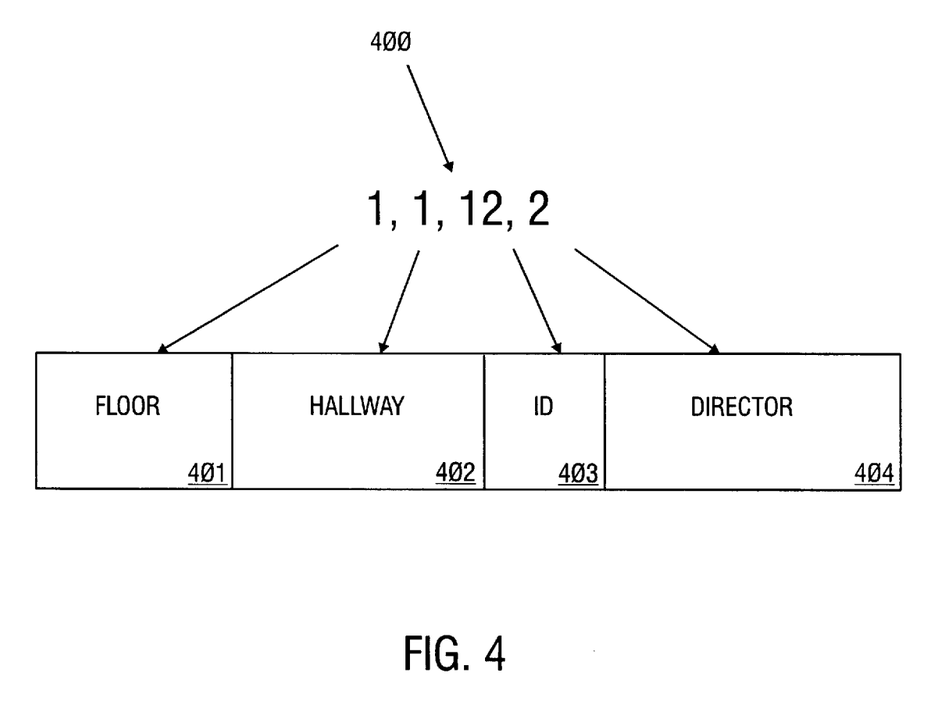
FIG. 4 shows an example transmission, including four code numbers, from one side of a main location beacon and shows the function identified for each of the four code numbers.

FIG. 4 provides an example of a set of code numbers 400 which may be transmitted from one side of main beacon 303. The first number 401 identifies the floor number. The second number 402 identifies the hallway number on the particular floor. The third number 403 is the room or facility identification number (ID). The fourth number, which may be a 0, 1, or 2, provides beacon, and thus hallway, polarity, and is termed the "director." The director "2" is transmitted in the direction of descending ID numbers, so that an IRRM aimed in the direction of increasing rank order of ID numbers will receive the director "2" from any beacon that is detected. The system's use of the director information is further discussed below. Conversely, the director "1" is transmitted in the direction of ascending ID numbers. Auxiliary beacons transmit the director "0." The set of code numbers 400 in FIG. 4 is "1, 1, 12, 2" and, therefore, identifies the 1st floor, hallway number 1, room or facility 12, and director 2. The auxiliary beacon associated with a main beacon emitting the set code numbers 400 would, therefore, serially transmit the code numbers "1, 1, 12, 0." It is noted that alternative conventions may be used for the location beacon transmissions, with corresponding changes in the search algorithm discussed below.

As discussed in more detail below, a location beacon positioned at a hallway intersection would not generally have an auxiliary beacon associated with it. Such intersection beacons may be designed to transmit in three or four directions, and the hallway numbers for the intersection beacons may be identical to the hallway numbers for the hallways they link. The intersection beacons may also have an ID number like any room or facility. This is demonstrated by beacon 508 in FIG. 5A, which links hallways 1, 2 and 3.

The operation of a system according to the present invention will now be described in more detail with respect to FIGS. 5A and 5B and 6A and 6B.

Figure 5A:
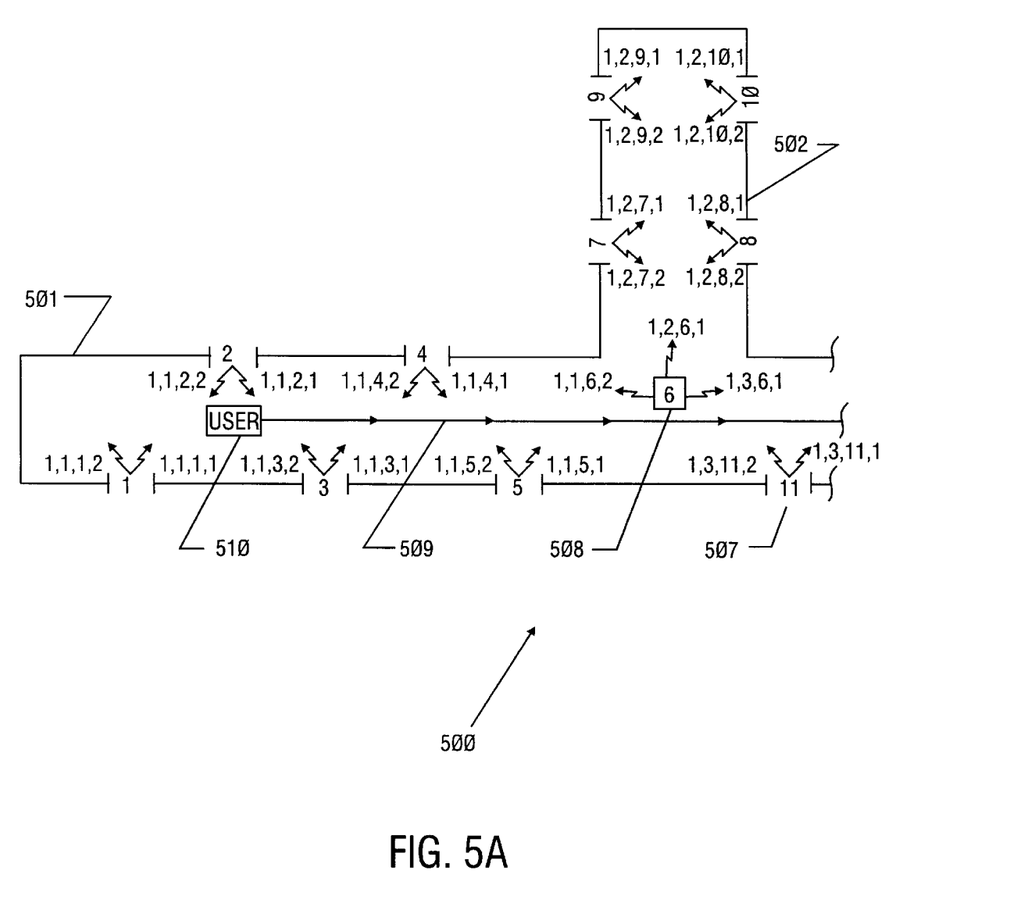
FIGS. 5A and 5B are a diagram showing an example floor plan for a building, the position of location beacons, the respective sets of code numbers for each location beacon, and the route of a user.
Figure 5B:
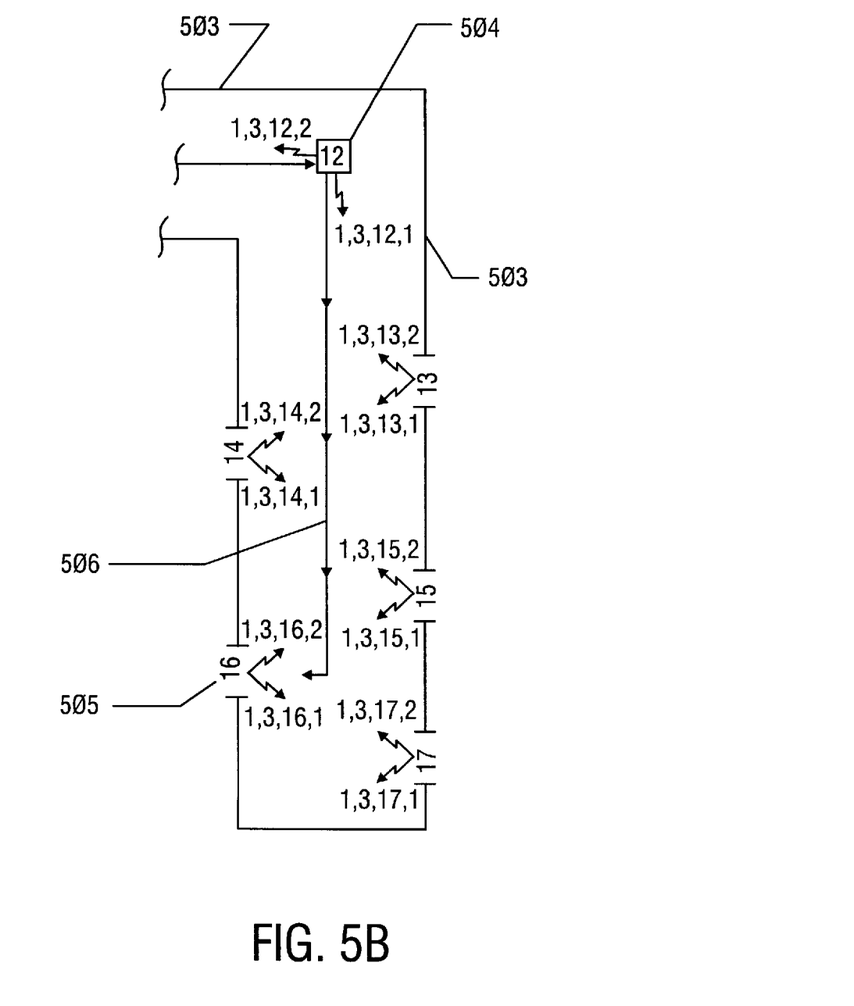

FIGS. 5A and 5B are a diagram of an example arrangement 500 of a plurality of main beacons located at doorways within intersecting hallways on a floor inside of a building. The hallways include doorways identified with the identification numbers 1–17. These figures also provide the respective sets of numerical codes that the main beacons transmit, along with the general direction of these transmissions. All sets of code numbers begin with the number "1," designating that the beacons are all located on the first floor. The floor has been divided, by the intersection of hallways, into three hallway segments 501, 502 and 503, which are defined by the second code number related to each transmission. The third code number provides the room or facility ID number. The fourth number transmitted by each main beacon is either the director "1" or "2," which serves to polarize the hallways. For example, if a user moves in a direction such that the IRRM detects only the director "2," the IRRM may determine that the ID numbers in that direction are in increasing rank order, as discussed above with respect to FIG. 4. Conversely, a user traveling in the direction where the director "1" is being detected, will detect beacons with decreasing ID numbers.

Figure 6A:
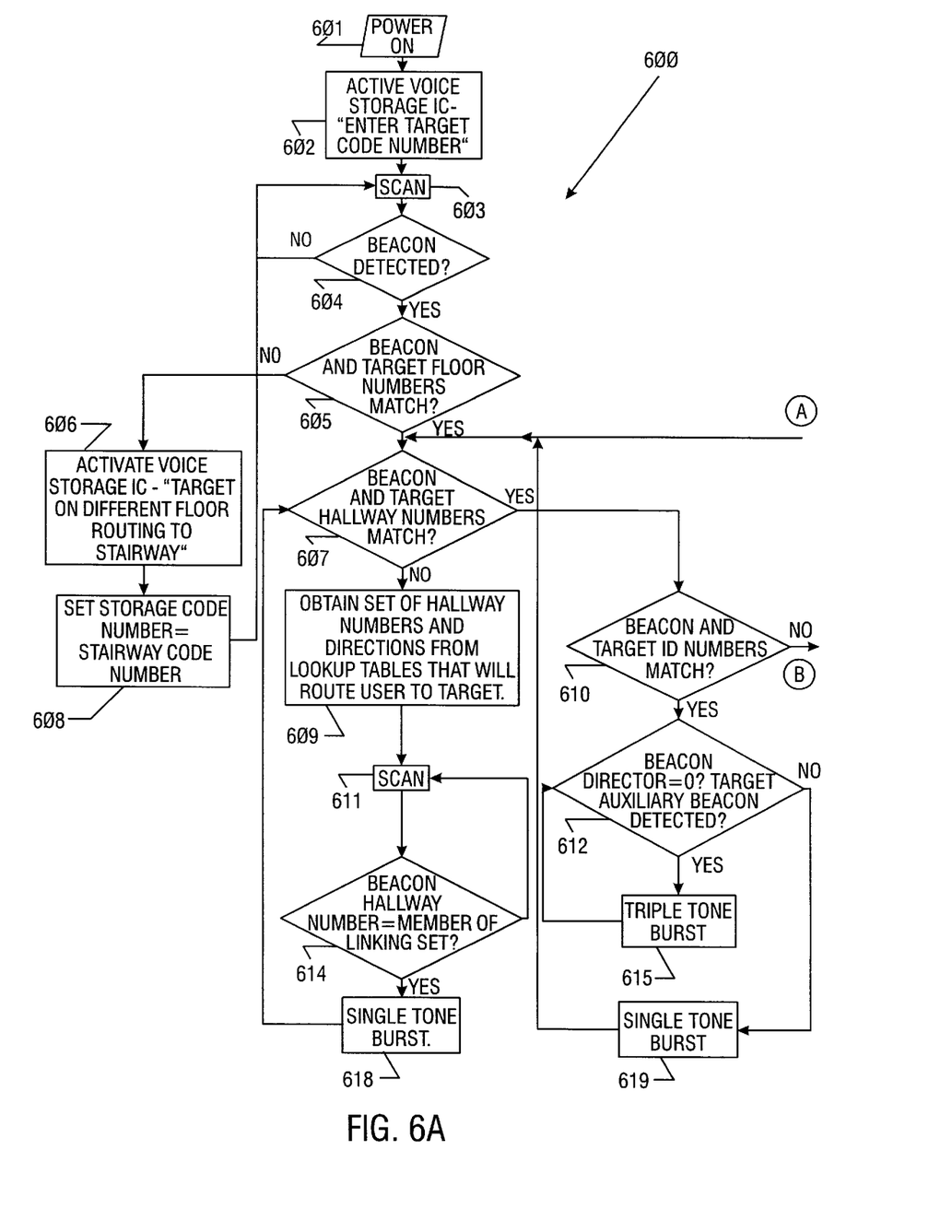
FIGS. 6A amd 6B are a flowchart of an example search algorithm that may be used by the programmable portable navigation unit, according to the present invention.
Figure 6B:
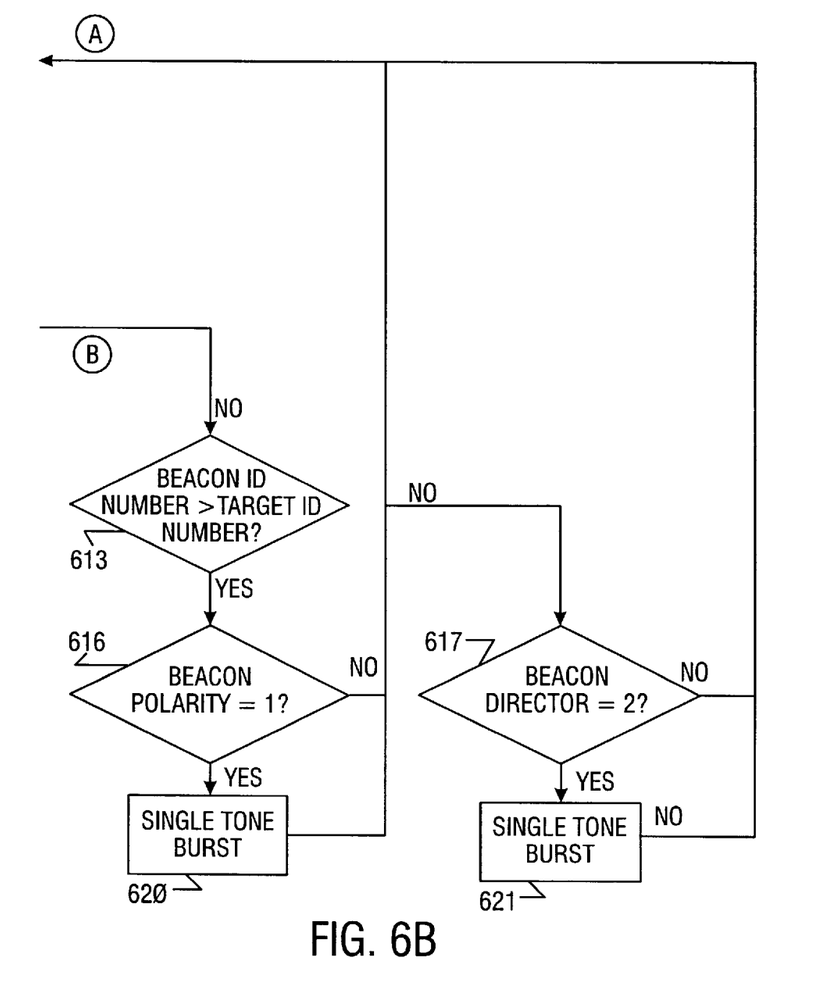

FIGS. 6A and 6B are a flow chart of an example search algorithm that may be implemented by a portable autorouting navigation unit, according to the present invention, to guide a user to a desired location. An example user of this system is depicted in FIGS. 5A and 5B. Using the search algorithm provided in FIGS. 6A and 6B, the portable unit will guide the user from his or her starting location 510, along path 509 and 506, through hallway 501 (i.e., hallway number 1) and hallway 503 (i.e., hallway number 3), and finally to the desired target beacon 505 at door 16.

Following the flow chart of FIGS. 6A and 6B, the user first turns on the IRRM in step 601 and is instructed to enter a target ID number in step 602. For the example user in FIGS. 5A and 5B, the number 116 (i.e., first floor, door number 16) is punched into the keypad. The user then scans the area in step 603. Decision step 604 provides a loop until a beacon is detected. Assuming that the user in FIGS. 5A and 5B initially detects beacon "3," the code set "1, 1, 3, 2" will be received by the IRRM and program control is passed to decisional block 605.

In decision block 605, the microcontroller under program control will look at the first code number (i.e., "1") and determine whether the user is on the same floor as the target location 505. If not, step 606 provides the user with a voice message, such as "Target on Different Floor, Routing to Stairway." And step 608 sets the target code to the identification number for the stairway access. Thus, if the user in FIGS. 5A and 5B had started out on the second floor and the target beacon chosen was on the first floor, a mismatch would have occurred in the floor numbers in step 605. The voice-storage IC in the IRRM would be activated in step 606 to inform the user that he or she was on floor 2 and was being routed to a stairway. The user would, therefore, know to descend one floor. When the first floor was reached, the IRRM may be reset, for example by turning the power off and on, and the original target ID number may be reentered via the keypad. The search would then begin again. If desired, autorouting between floors could be integrated into the search algorithm.

If the target beacon is on the same floor as the detected beacon, control passes to decision block 607. If the hallway number of the detected beacon matches the hallway number of the target beacon, then control passes to decision block 610. If not, as is the case for the example user in FIGS. 5A and 5B, control passes to step 609.

In step 609, the microprocessor under program control scans the lookup table, using logic statements, to find a set of hallway numbers and directors that will guide the user to the target beacon. In FIGS. 5A and 5B, for example, the user must be guided from beacon "3" to beacon "16." Step 609, therefore, provides a list of hallway and director links as follows: (1) hallway 1, director 2, and (2) hallway 3, director 2. The lookup tables include information linking hallways to each other, so that the microcontroller may determine a routing path from the user's location to the target location. These lookup tables may also include information linking each location beacon to each other location beacon, although such a structure would likely take up more memory space on the microcontroller. By grouping location beacons in hallway groups, each hallway may be linked to each other hallway, thereby taking up less memory storage space and reducing processing time. The lookup tables would vary depending upon the arrangement of beacons, and the environment into which the beacons are placed. Thus, a wide variety of data structures could be utilized depending upon the complexity of the beacon arrangements. The only requirement is that the system be able to identify a routing path that will guide the user to the desired target location.

The user continues to scan in step 611. If the beacon code numbers received identify a hallway within the linking set or routing path, decision block 614 passes control to step 618 in which a single tone burst is emitted. If not, decision block 614 loops back to step 611. As the user moves along path 509 in FIGS. 5A and 5B, the microcontroller will continue to compare beacon hallway numbers with the target hallway number. If a match occurs, program controller passes from decision block 607 to decision block 610, where the program begins comparing received beacon ID numbers with the target ID number.

If a match does not occur between the received beacon ID number and the target ID number, program control passes to decision block 613, where the beacon ID number is compared with the target ID number. If the beacon ID number is larger, and the beacon polarity is "1," decision block 616 causes a single sound burst to be emitted in step 620. Program control then passes to decision block 607. If the beacon ID number is larger, and the beacon polarity is not "1," program control directly passes to decision block 607. If the beacon number ID is smaller than the target ID number and the beacon director is "2," decision block 617 causes a single sound burst to be emitted in step 621. Program control then passes to decision block 607. If the beacon ID number is smaller, and the beacon polarity is not "2," program control directly passes to decision block 607. In this way, the user is kept on the appropriate director path to the desired location.

If a match occurs between the received beacon ID number and the target ID number, program control passes to decision block 612, where the program examines the received beacon director for a "0." When a "0" is detected, a triple tone burst is sent out in step 615, for example to an earphone, indicating that the target auxiliary beacon has been located. Once the target auxiliary beacon has been detected, program control is locked into a loop between step 612 and decision block 615, which looks for the target auxiliary beacon. The user, therefore, may follow the triple tone burst signal until the auxiliary beacon is physically contacted, at which point the user knows that the desired target has been reached.

In the embodiment described herein, the main beacons may be detected by the IRRM up to 100 feet. This provides a considerable safety factor. If a user switches on the IRRM while standing in the hallway containing the target beacon, he or she would likely detect the target immediately by scanning in all directions because most hallways are less than 100 feet long. If the user were turned away from the target beacon while in the hall containing the target beacon, the program would begin comparing ID numbers of detected beacons with that of the target ID number. If the beacon ID number was greater than the target ID number, and the director "1" was also detected, a single tone burst would be sent to the earphone in step 620. This would indicate to the user that he or she should progress in that direction. The user would be traveling toward beacons with smaller ID numbers. Thus, the target beacon would eventually be detected. If a user passes the target beacon, ID numbers less than the target ID number will be received. Take the case, for example, in which the ID numbers being detected are smaller than the target ID number because the target has been passed. The director "1" would be received by the IRRM, indicating that the user was traveling towards smaller ID numbers and away from the higher target ID number. Thus, no signal would be sent to the earphone. The user would then have to reverse direction and receive a "2" director. A signal would then be sent to the earphone in step 620. Although this scenario is unlikely in practice due to the long range of the system, it illustrates the utility of using directors to alleviate problems with a user passing a target or backtracking.

Further modifications and alternative embodiments of the present invention will be apparent to those skilled in the art in view of this description. For example, the IRED beacon transmitters, the IRRM portable receiver system, program control flow chart, and other detailed diagrams shown are example embodiments of the present invention. However, it will be recognized that the present invention is not limited to these embodiments. Accordingly, this description is to be construed as illustrative only and is for the purpose of teaching those skilled in the art the manner of carrying out the invention. It is to be understood that the forms of the invention herein shown and described are to be taken as presently preferred embodiments. Equivalent elements or materials may be substituted for those illustrated and described herein, and certain features of the invention may be utilize independently of the use of other features, all as would be apparent to on skilled in the art after having the benefit of this description of the invention.

What is claimed is:

1. An autorouting navigation system for directing one or more visually impaired persons to a physical location, comprising:

a plurality of passive location beacons positioned at a plurality of physical locations for emitting distinct coded signals for each of said plurality of passive location beacons including information representative of physical locations of said passive location beacons, each said plurality of passive location beacons comprising:

a transmitter for emitting said distinct coded signal; and         control means for causing said transmitter to emit said distinct coded signal; and     at least one portable navigation unit, comprising:

an input device for selecting a target location corresponding to a physical location of one of said plurality of passive location beacons;

a receiver configured to receive said distinct coded signals from said plurality of passive location beacons;

a memory storing correlation data linking said plurality of passive location beacons;

an output device; and control means electronically coupled to said input device, said receiver, said memory and said output device for processing said distinct coded signals from said plurality of passive location beacons, and for analyzing said correlation data to determine a routing path to said target location, and for causing said output device to indicate to a user that said user is following said routing path to said target location, wherein said autorouting navigation system is capable of concurrently directing multiple users.

2. The autorouting navigation system of claim 1, wherein said plurality of passive location beacons are organized into a plurality of groups of passive location beacons and said correlation data links said plurality of groups of passive location beacons.

3. The autorouting navigation system of claim 2, wherein a distinct coded signal emitted by a passive location beacon within a group of passive location beacons includes information identifying said passive location beacon within said passive location beacon's respective group.

4. The autorouting navigation system of claim 1, wherein at least one of said plurality of passive location beacons includes a plurality of transmitters having at least two transmission directions for emitting signals in non-overlapping directions.

5. The autorouting navigation system of claim 4, wherein said at least two transmission directions are separated by over 90°.

6. The autorouting navigation system of claim 2, wherein said plurality of groups of passive location beacons identify location beacons within respective hallways.

7. The autorouting navigation system of claim 2, wherein each said group of passive location beacons include a master beacon and a plurality of slave beacons, said plurality of slave beacons being serially activated by said master beacon to prevent interference between said master beacon and said plurality of slave beacons.

8. The autorouting navigation system of claim 1, wherein said distinct coded signals emitted by said plurality of passive location beacons are infrared signals.

9. A portable autorouting navigation unit for guiding a visually impaired person to a physical location, comprising:
   an input device for selecting a target location corresponding to a physical location of one of a plurality of passive location beacons;
   a receiver configured to receive distinct coded signals from said plurality of passive location beacons, wherein each of said plurality of passive location beacons is capable of concurrently sending said distinct coded signals to more than one portable autorouting navigation unit;
   a memory storing correlation data linking said plurality of passive location beacons;
   an output device; and
   control means electronically coupled to said input device, said receiver, said memory means and said output device for processing said distinct coded signals from said plurality of passive location beacons, and for analyzing said correlation data to determine a routing path to said target location, and for causing said output device to indicate to a user that said user is following said routing path to said target location.

10. The portable autorouting navigation unit of claim 9, wherein said output device comprises a speaker electrically connected to receive the output of a voice storage circuit.

11. The portable autorouting navigation unit of claim 9, wherein said input device comprises a numeric keypad.

12. The portable autorouting navigation unit of claim 9, wherein said receiver is capable of receiving infrared signals.

13. The portable autorouting navigation unit of claim 9, wherein said correlation data links each of said plurality of passive location beacons.

14. A method of automatically routing at least one visually impaired person to a target location, comprising the steps of:
   positioning a plurality of passive location beacons at physical locations;
   generating correlation data linking said plurality of passive location beacons;
   storing said correlation data within a portable navigation unit;
   inputting a target location into said portable navigation unit;
   determining with said portable navigation unit a routing path to said target location;
   scanning with said portable navigation unit to detect a distinct coded signal from at least one of said plurality of passive location beacons;
   determining with said portable navigation unit whether said distinct coded signal corresponds to said routing path; and
   providing an output signal indicating to a user whether said user is proceeding along said routing path to said target location, wherein said method of automatically routing is capable of concurrently routing multiple users.

15. The method as claimed in claim 14, wherein positioning step comprises positioning said plurality of passive location beacons at physical locations within the interior hallways of a building.

* * * * *